(12) United States Patent
Hosomizo et al.

(10) Patent No.: US 10,459,672 B2
(45) Date of Patent: Oct. 29, 2019

(54) INFORMATION PROCESSING APPARATUS, AND NON-TRANSITORY COMPUTER-READABLE MEDIUM STORING INSTRUCTIONS THEREFOR

(71) Applicant: Brother Kogyo Kabushiki Kaisha, Nagoya-shi, Aichi-ken (JP)

(72) Inventors: Yoshito Hosomizo, Nagoya (JP); Mareyuki Murata, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/021,435

(22) Filed: Jun. 28, 2018

(65) Prior Publication Data
US 2019/0095160 A1 Mar. 28, 2019

(30) Foreign Application Priority Data
Sep. 28, 2017 (JP) .................. 2017-188347

(51) Int. Cl.
G06F 3/12 (2006.01)

(52) U.S. Cl.
CPC ............ *G06F 3/1284* (2013.01); *G06F 3/125* (2013.01); *G06F 3/1208* (2013.01); *G06F 3/1211* (2013.01); *G06F 3/1215* (2013.01); *G06F 3/1219* (2013.01); *G06F 3/1285* (2013.01)

(58) Field of Classification Search
CPC .... G06F 3/1211; G06F 3/1212; G06F 3/1215; G03G 15/234; G03G 15/50; H04N 1/2369

USPC .......... 358/1.12, 1.13, 1.14; 399/82, 85, 306
See application file for complete search history.

(56) References Cited

U.S. PATENT DOCUMENTS

| 5,282,050 A | 1/1994 | Ishizuka et al. |
| 6,927,865 B1 | 8/2005 | Kujirai et al. |
| 2005/0270552 A1* | 12/2005 | Sakamoto ............... G06F 3/121 358/1.13 |
| 2010/0296831 A1 | 11/2010 | Sakai |

FOREIGN PATENT DOCUMENTS

JP 2011-044152 A 3/2011

OTHER PUBLICATIONS

Oct. 12, 2018—(EP) Extended Search Report—App 18180510.2.

* cited by examiner

*Primary Examiner* — Jamares Q Washington
(74) *Attorney, Agent, or Firm* — Banner & Witcoff, Ltd.

(57) ABSTRACT

A printer driver does not transmit a page start command for a first page of a print job to a printer at a time when the printer driver receives page start information for the first page of the print job. The printer driver transmits the page start command for the first page to the printer in a mode related to a both-side designating command, in response to receipt of the page start command for a second page. When the printer driver receives job end information for the print job without receiving the page start information for the second page, the printer driver transmits the page start command corresponding to the first page in a mode related to the one-side designating command, thereby one-side printing being performed when the number of pages of a print-target document is one and the print setting is set to the both-side printing.

13 Claims, 8 Drawing Sheets

INFORMATION PROCESSING APPARATUS, AND NON-TRANSITORY COMPUTER-READABLE MEDIUM STORING INSTRUCTIONS THEREFOR

CROSS-REFERENCE TO RELATED APPLICATIONS

This application claims priority under 35 U.S.C. § 119 from Japanese Patent Application No. 2017-188347 filed on Sep. 28, 2017. The entire subject matter of the application is incorporated herein by reference.

BACKGROUND

Technical Field

The present disclosures relate to an information processing apparatus and a non-transitory computer-readable recording medium storing instructions to control the information processing apparatus.

Related Art

Typically, a conventional printer is configured to selectively executing one-side printing and both-side printing. A printer driver of such a printer is configured to transmit one of a one-side designating command indicating the one-side printing and a both-side designating command indicating the both-side printing.

SUMMARY

A case in which a document (hereinafter, referred to as a print-target document) containing images for one page or more is to be printed will be considered. When the number of pages of the document is more than one, and a print mode is set to the both-side printing, an image for a first page of the document is printed on one surface of a printing sheet. However, when there is no image to be printed on the other surface of the printing sheet, execution of the both-side printing is wasteful. Aspects of the present disclosures are directed to resolve such wastefulness. Typically, in a process of the both-side printing, a so-called switchback of the printing sheet is performed to reverse the sides of the sheet inside the printer, and an image for a second page of the document is printed on the other surface of the printing sheet. Thereafter, the printing sheet is discharged from the printer. When the total number of pages of the print-target document is one and the print mode is set to the both-side printing, the switchback of the printing sheet is unnecessarily performed inside the printer, and the printing sheet is discharged with an opposite surface being directed upside in comparison with a case where such a print-target document is printed in accordance with the one-side printing mode.

According to aspects of the present disclosures, there is provided a non-transitory computer-readable medium for an information processing apparatus having a communication interface and a controller, the communication interface being configured to communicate with a printer, an operating system being installed in the information processing apparatus. The non-transitory computer readable medium stores instructions realizing a printer driver, the operating system is configured to cause the controller to output a print job to print a document having one or more pages of images delimited by each page to the printer driver, and the operating system is configured to cause the controller to output page start information indicating a start of each page of the print job and job end information indicating an end of the print job to the printer driver. The operating system is configured to cause the controller to output the print job to the printer in a mode related to one of both-side designating information indicating the print job is a both-side printing job and one-side designating information indicating the print job is a one-side printing job. In a state where the print job output by the operating system is related to the both-side designating information, the printer driver causing, when executed, the controller not to transmit the page start command corresponding to a first page of the print job to the printer in response to receipt of page start information indicating a start of the first page of the print job from the operating system, to transmit the page start command corresponding to the first page of the print job to the printer through the communication interface in a mode related to the both-side designating command indicating the both-side printing in response to receipt of page start information indicating a start of a second page of the print job, and to transmit the page start command corresponding to the first page of the print job to the printer through the communication interface in a mode related to the one-side designating command indicating the one-side printing in response to receipt of the job end information from the operation system without receiving the page start information indicating a start of the second page of the print job from the operating system.

According to aspects of the present disclosures, there is provided an information processing apparatus having a communication interface and a controller, the communication interface being configured to communicate with a printer, an operating system and a printer driver for the printer being installed in the information processing apparatus, the non-transitory computer readable medium storing instructions realizing a printer driver, the operating system is configured to cause the controller to output a print job to print a document having one or more pages of images delimited by each page to the printer driver, the operating system is configured to cause the controller to output page start information indicating a start of each page of the print job and job end information indicating an end of the print job to the printer driver, and the operating system is configured to cause the controller to output the print job to the printer in a mode related to one of both-side designating information indicating the print job is a both-side printing job and one-side designating information indicating the print job is a one-side printing job. In a state where the print job output by the operating system is related to the both-side designating information, the controller execute the printer driver not to transmit the page start command corresponding to a first page of the print job to the printer in response to receipt of page start information indicating a start of the first page of the print job from the operating system, to transmit the page start command corresponding to the first page of the print job to the printer through the communication interface in a mode related to the both-side designating command indicating the both-side printing in response to receipt of page start information indicating a start of a second page of the print job, and to transmit the page start command corresponding to the first page of the print job to the printer through the communication interface in a mode related to the one-side designating command indicating the one-side printing in response to receipt of the job end information from the operation system without receiving the page start information indicating a start of the second page of the print job from the operating system.

According an embodiment of the present disclosures, a printer driver does not transmit a page start command for a first page of a print job to a printer at a time when the printer driver receives page start information indicating a start of the first page of the print job. The printer driver transmits the page start command for the first page to the printer in a mode related to a both-side designating command, in response to receipt of the page start command indicating the start of a second page. When the printer driver receives job end information indicating an end of the print job without receiving the page start information indicating the start of the second page from the operating system, the printer driver transmits the page start command corresponding to the first page in a mode related to the one-side designating command. According to this configuration, one-side printing can be performed when the number of pages of the image(s) of a print-target document is one and the print setting is set to the both-side printing.

BRIEF DESCRIPTION OF THE ACCOMPANYING DRAWINGS

DETAILED DESCRIPTION OF THE EMBODIMENT

<Configuration of Printer System>

Figure 1:
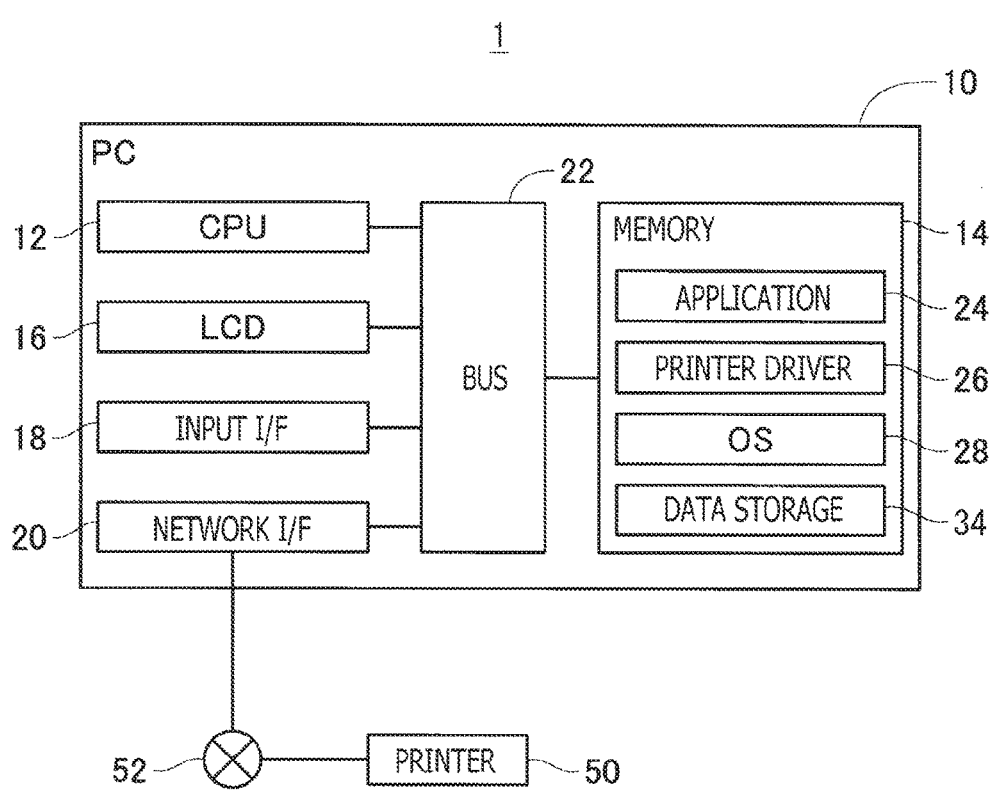
FIG. 1 is a block diagram of a printer system according to an embodiment of the present disclosures.

FIG. 1 is a block diagram of a printer system 1 according to an illustrative embodiment of the present disclosures. The printer system 1 shown in FIG. 1 has a PC (an example of an information processing apparatus) 10 and a printer 50. The PC 10 mainly has a CPU (an example of a computer and a controller) 12, a memory 14, an LCD 16, an input I/F 18 and a network I/F (an example of a communication interface) 20. The above-described components of the PC are interconnected through a bus 22 so as to be communicable with each other.

The PC 10 and the printer 50 are configured to communicate with each other through the network I/F 20 and a network 52. As a communication method, one using a wired LAN, a USB, the Wi-Fi (registered trademark) or the Bluetooth® may be employed.

It is noted that the printer 50 is a device configured to selectively perform the one-side printing and the both-side printing. According to the embodiment, the printer 50 is configured to discharge a printing sheet in a face-up manner such that the printing sheet is discharged with its printed surface directed upward.

The CPU 12 executes various processes in accordance with applications 24, a printer driver 26 and an OS 28 in the memory 14. The applications 24 include programs used to create contents such as a word processing software used for creating a document content, a spreadsheet software used for creating a spreadsheet content and a presentation software used to create a presentation content. The contents created by the applications 24 are printed by the printer 50 connected to the PC 10 as the respective applications 24 instruct the OS 28 to print the same. When an application 24 instructs the OS 28 to print the content, the applications 24 outputs content data representing the content to be printed in a format which the OS 28 is capable of interpreting.

In this regard, in the following description, the contents data the application 24 transmits to the OS 28 will be described as a kind of image data. The printer driver 26 is a device driver of the printer 50, and controls, when executed by the CPU 12, operations of the printer 50. The OS 28 is a program presenting basic functions which will be used by the applications 24 and the printer driver 26. That is, the OS 28 is an operating system such as Windows (registered trademark), Mac OS (registered trademark), Linux (registered trademark), Android (registered trademark), iOS (registered trademark) and the like.

It is noted that, in the following description, the CPU 12 executing an application will occasionally be referred to by the name of the application. For example, the CPU 12 executing the printer driver 26 (i.e., causing the printer driver 26 to control the printer 50) to perform a printing process will occasionally be described such that the printer driver 26 executes the printing process.

The memory 14 has a data storage area 34. The data storage area 34 is an area configured to store data necessary to execute the printer driver 26 and the like. It is noted that the memory 14 is configured as a combination of a RAM, a ROM, a flash memory, an HDD and a buffer provided to the CPU 12 or the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various functions of the PC 10. The input I/F 18 is an interface enabling a user to input a user operation, and includes a keyboard and a mouse therefor.

<Printing Process by Printer System>

In accordance with recent trend of resource saving, it has been desired that, in a printer capable of performing the both-side printing and the one-side printing selectively, the both-side printing is set as a default operation mode. However, when the both-side printing is set as the default setting, when a document having only one page is printed and the user has not changed the print mode from the both-side printing to the one-side printing, a printing process in accordance with the both-side printing mode is performed by the printer.

When the printing process in accordance with the both-side printing mode is performed, after printing an image on one side of a printing sheet, depending on a type of the printer, a so-called "switch-back" of the printing sheet is performed in order to prepare for printing on the other side of the printing sheet. When the total number of pages of a print-target document is one, and the printing process according to the both-side printing mode is performed, the switch-back operation is unnecessarily performed. When such an unnecessary switch-back operation is performed, although printing of the print-target document has been completed, the printing sheet is not discharged from the printer, and an FPOT (i.e., a time period from an operation of a print start button to discharge of the printing sheet) is elongated. Furthermore, as the switch-back operation is unnecessary performed, depending on the type of the printer, vibrations and/or noises may be generated unnecessarily. Still further, as the switch-back operation is performed unnecessarily, depending on the type of the printer, discharging of the printing sheet stops in the middle of operation, and the printing sheet is switched back before it is finally discharged. Such an operation may cause a user of the printer to feel a sense of distrust.

In addition, in the printing process according to the both-side printing mode, an ejection amount of the ink onto the printing sheet is restricted in order to prevent a set-off of the image formed on one side. Therefore, there is a tendency that quality of the printed image in accordance with the both-side printing mode becomes lower than the image printed in accordance with the one-side printing mode. Therefore, when the print-target document has only one page of image, it is preferable that the printing is performed in accordance with the one-side printing mode even if the printing mode is set to the both-side.

Typically, when a document having one or more pages is printed, a print job delimited by each page is transmitted from the OS 28 to the printer driver in the order of the pages. When the print mode is set to the both-side printing mode, according to a conventional process of the printer driver, every time when the printer driver receives the print job which is delimited by each page, the printer driver creates image data for printing (hereinafter, referred to as printing image data) corresponding to the both-side printing. Therefore, with use of the conventional printer driver is used, when the print mode is set to the both-side printing mode, even if the total page of the print-target document is one, a printing process according to the one-side printing mode cannot be performed. The reason why the printing process according to the one-side printing mode cannot be performed will be described in detail with reference to a sequence chart shown in FIG. 2. For the sake of description, it is assumed that a conventional printer driver 100 is installed in a PC 10A (not shown), while the PC 10A has the same configuration as the PC 10 shown in FIG. 1 except that the PC 10A has the conventional printer driver 100 instead of the printer driver 26 of the PC 10. For the sake of explanation, components of the PC 10A are assigned with reference numbers which are same as those of the PC 10 (FIG. 1) except that a suffix "A" is added to each reference number.

It is noted that, in the following description, processes of the CPU 12 in accordance with instructions scripted in programs are basically indicated. Processes indicated by terms "determine", "extract", "select". "calculate", "judge", "identify", "obtain", "receive", "control", and "set" are the processes of the CPU 12. It is noted that the processes executed by the CPU 12 include a hardware control through the OS 28. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Alternatively, the terms "instruct", "respond" and "request" may be used to mean the information indicating the "instruct", "respond" and "request", respectively.

Firstly, in accordance with user's operations through an input I/F 18A of the PC 10A, an application 24A creates image data of a document including one or more of pages of images to be printed by the printer 50. At this stage, the user selectively sets one of the both-side printing and the one-side printing as one of print conditions by operating the input I/F 18A. When the user does not selectively set the both-side printing or the one-side printing, the both-side printing is set in accordance with default settings. When the image data has been created, the application 24A transmits the image data as created and the print condition as set (hereinafter, referred to as setting information) to the OS 28A. It is noted that the setting information typically includes not only the information indicating the both-side printing or the one-side printing, but other pieces of information such as information indicating a size of the printing sheet, information indicating a print resolution and the like.

Figure 2:
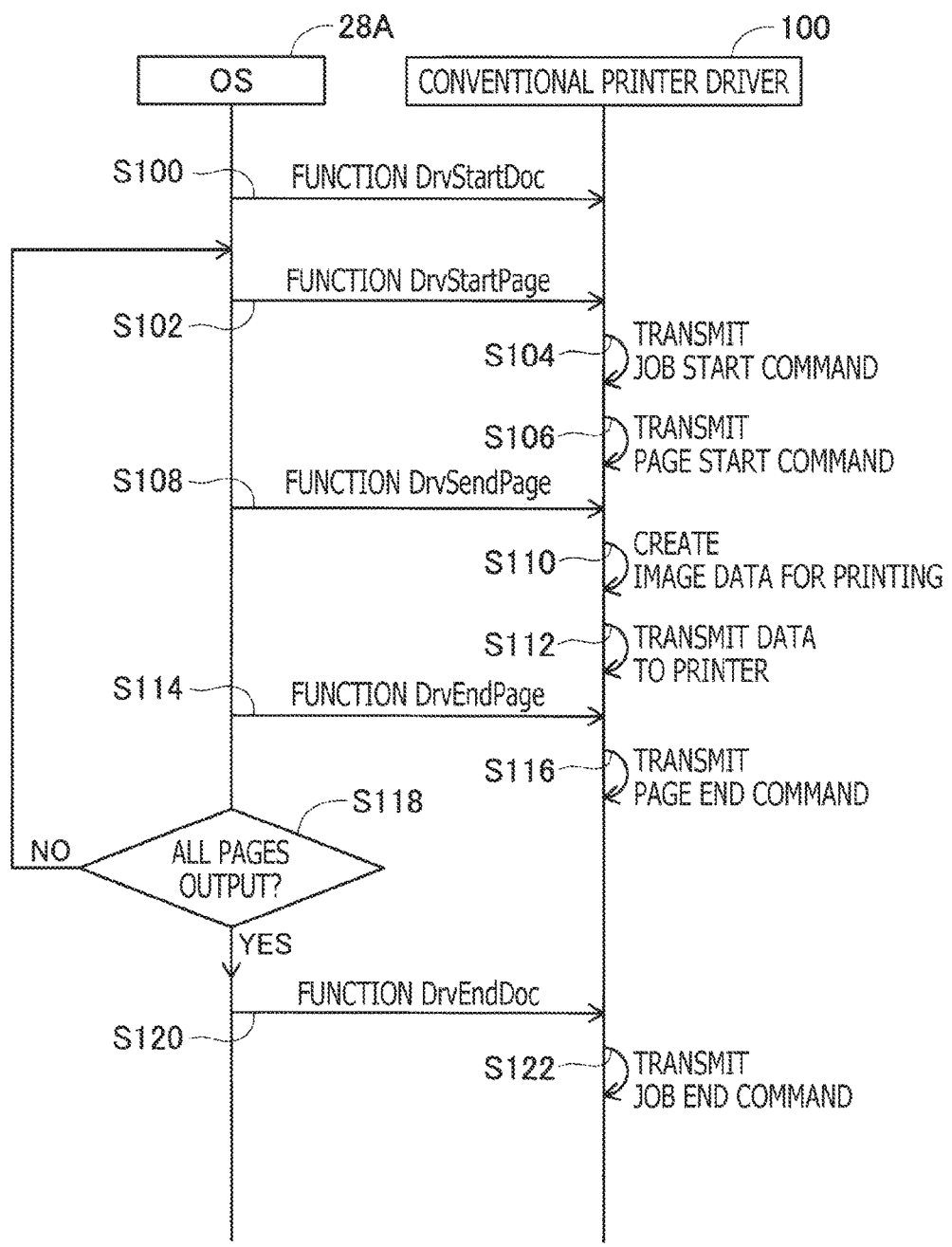
FIG. 2 shows an operation sequence of a conventional printer driver and an OS.

When the OS 28A receives the image data from the application 24A, the OS 28A calls a function DrvStartDoc of the conventional printer driver 100 (FIG. 2. S100). The function DrvStartDoc is a function indicating start of a print job. Next, the OS 28A calls a function DrvStartPage of the printer driver 100 (S102). The function DrvStartPage is a function indicating start of each page of the print job, and the setting information is associated to the function DrvStartPage. That is, when the OS 28A calls functions of the printer driver, the OS 28A associates the setting information to respective functions. For example, when the OS 28A calls the function DrvStartPage, the OS 28A includes one of information indicating that the both-side printing is set (hereinafter, referred to as both-side setting information) and information indicating that the one-side printing is set (hereinafter, referred to as one-side setting information) in arguments of the function DrvStartPage as one of the setting information.

It is noted that, the arguments of the function DrvStartPage include page position information (i.e., information indicating to which page of the document the print job as transmitted corresponds) (hereinafter, referred to as a page position information). As described above, the print job is a job to print the document including images for one page or more. The document is delimited at every one page, and the print job corresponding to each page is output to the conventional printer driver 100 in the order of the pages of the document. For example, when a print job for the first page of the document is transmitted to the printer driver 100A, information indicating that the print job is for the first page of the document is included, as page position information, in the function DrvStartPage.

When the function DrvStartPage is called by the OS 28A, the conventional printer driver 100 transmits a job start command to the printer 50 (S104). The job start command is a command indicating start of the print job of the document. Next, the conventional printer driver 100 transmits the page start command to the printer 50 (S106). The page start command is a command indicating start of the print job of each page of the document which has one of more pages of images to be printed. It is noted that, when the conventional printer driver 100 transmits the page start command to the printer 50, the conventional printer driver 100 designates a page indicated by the page position information included in the function DrvStartPage. For example, when information indicating that the print job is for the first page of the document as the page position information in the function DrvStartPage, the conventional printer driver 100 transmits the page start command to the printer 50 with designating the first page.

The page start command is transmitted to the printer 50 in a mode including a command corresponding to the setting information included in the function DrvStartPage. For example, when the setting information included in the function DrvStartPage is the both-side setting information, the conventional printer driver 100 transmits the page start command to the printer 50 in a mode including a command designating the both-side printing (hereinafter, referred to as both-side designating command). It is noted that, when the setting information included in the function DrvStartPage is the one-side setting information, the conventional printer driver 100 transmits the page stat command to the printer 50 in a mode including a command designating the one-side printing (hereinafter, referred to as a one-side designating command).

In the printer 50 which has received the page start command, the print condition for each page is set in accordance with the both-side designating command or one-side designating command included in the page start command. That is, when the printer 50 has received the page start command including the both-side designating command, the print condition for each page is set to the both-side printing, while, when the printer 50 has received the page start command including the one-side designating command, the print condition for each page is set to the one-side printing.

Next, the OS 28A calls a function DrvSendPage of the conventional printer driver 100 (S108). The function DrvSendPage is a function indicating transmission of the image data, and an argument of the function DrvSendPage includes image data of an image for one page. It is noted that the OS 28A transmits the print job which is delimited for each page in accordance with the order of the pages as mentioned above, the OS 28A firstly calls the function DrvSendPage including the image data of the first page. Then, the conventional printer driver 100 creates the printing image data based on the image data included in the function DrvSendPage (S110). At this stage, when the setting information included in the function DrvStartPage, which has previously been called, is the both-side setting information, the conventional printer driver 100 creates image data for the both-side printing (hereinafter, referred to as both-side printing image data). On the other hand, when the setting information included in the function DrvStartPage, which has previously been called, is the one-side setting information, the conventional printer driver 100 creates image data for the one-side printing (hereinafter, referred to as one-side printing image data).

When having created the printing image data, the conventional printer driver 100 transmits the created image data to the printer 50 (S112). Then, the printer 50 performs the printing process based on the received printing image data. It is noted that, since, in the printer 50, the print condition has been set in accordance with the both-side designating command or the one-side designating command included in the previously received page start command, the print process is executed in accordance with the print setting. For example, when the printer 50 receives the both-side printing image data, the print condition has been set to the both-side printing. Therefore, the image based on the both-side printing image data is printing on one side of the printing sheet, and the switch-back of the printing sheet is performed upon completion of the printing of the image on the one side of the printing sheet.

Next, the OS 28A calls a function DrvEndPage of the conventional printer driver 100 (S114). The function DrvEndPage is a function indicating an end of each page of the print job. When the function DrvEndPage is called, the conventional printer driver 100 transmits a page end command to the printer 50 (S116). The page end command is a command indicating an end of the print job for each page of the image having one or more pages to be printed.

Next, the OS 28A determines whether the image data for all the pages of the document received from the application 24 (S118). That is, the OS 28A determines whether the OS 28A has called the function DrvSendPage with including therein the image data for all the pages. When the image data for all the pages of the document has not been output (S118: NO), the process of S102-S116 is executed. According to this process, when the number of pages of the document is more than one, the printing process for the second page or later is performed.

When it is determined that the image data for all the pages of the document has been output (S118: YES), the OS 28A calls a function DrvEndDoc of the conventional printer driver 100 (S120). The function DrvEndDoc is a function indicating an end of the print job. Then, the printer driver 100 transmits a job end command to the printer 50 (S122). The job end command is a command indicating an end of the print job of the document. Then, the process by the conventional printer driver 100 is terminated.

According to the process of the conventional printer driver 100 described above, if the document includes only one page of image, while the print condition of the document is set to the both-side printing, the process proceeds as follows. Firstly, the both-side printing image data for the first page is transmitted to the printer 50. In the printer 50, the both-side printing process of the first page is performed based on the both-side printing image data as received. Thereafter, the function DrvEndDoc is called. That is, according to the process by the conventional printer driver 100, after printing of the first page is performed in accordance with the both-side printing process, the end of the print job is recognized. Since the total number of the images of the document is one is recognized only after the image of the first page has been printed in accordance with the both-side printing process, when the print mode of the document is set to the both-side printing, it is impossible to perform the print process of the document having only one page of image according to the one-side printing mode. Further, printing of the image of the first page is performed in accordance with the both-side printing mode, the switch-back is performed after the image of the first page has been printed on one side of the printing sheet, and the printing sheet is discharged from the printer 50 in a facedown state (i.e., the surface on which the image is printed facing downward). That is, although the printer 50 is configured to discharge the printing sheets in the face-up manner, in the above situation, the printing sheet is discharged as if the printer is the face-down printer, and the user may have a feeling of strangeness.

According to the present embodiment using the printer driver 26, transmission of the page start command of the first page to the printer 50, creation of the printing image data for the first page are performed after it is identified that the total number of the pages of the images of the document is two or more. Hereinafter, a process according to the printer driver 26 will be described with reference to a sequence chart shown in FIG. 3.

When the OS 28 receives the image data from the application 24, the OS 28 calls a function DrvEnableSurface of the printer driver 26 (S200). The function DrvEnableSurface of the printer driver 26 is associated with the setting information. It is noted that, not only the function DrvEnableSurface but functions other than the function DrvEnableSurface are associated with the setting information. Then, when the function DrvEnableSurface is called, the printer driver 26 executes a DrvEnableSurface subroutine (S201).

Figure 4A:
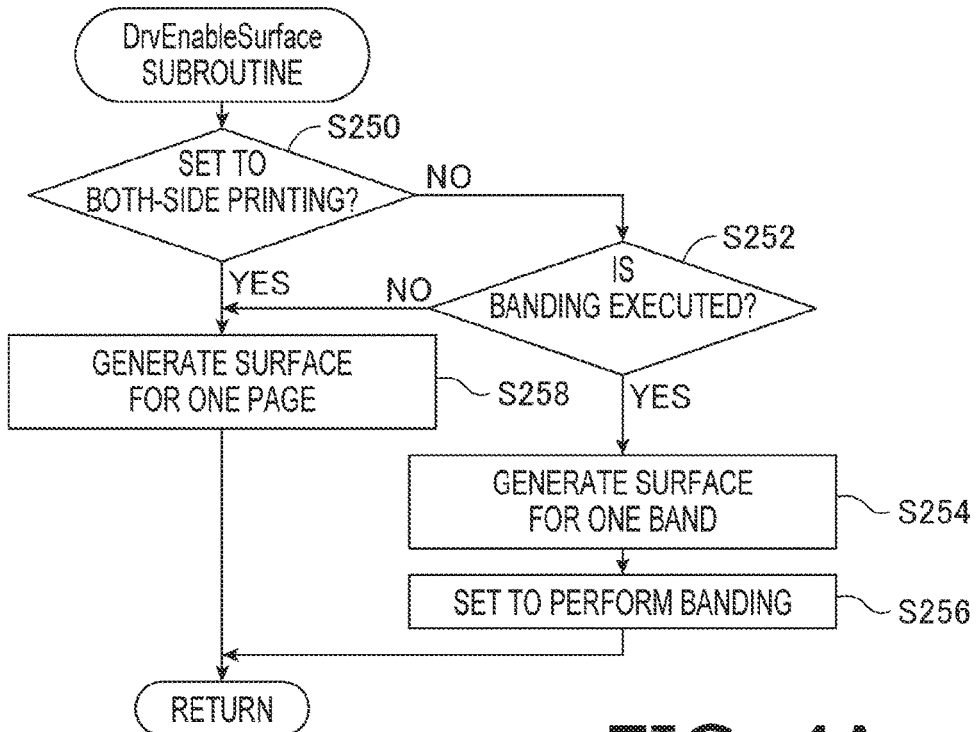
FIG. 4A is a flowchart illustrating a DrvEnableSurface subroutine according to the embodiment.

In the DrvEnableSurface subroutine, as shown in FIG. 4A, the printer driver 26 determines whether the print job is set to the both-side printing (S250). That is, the printer driver 26 determines whether the setting information included in the function DrvEnableSurface includes the both-side setting information. When it is determined that the setting information included in the function DrvEnableSurface does not contain the both-side setting information, that is, when the function DrvEnableSurface contains the one-side setting information, the printer driver 26 determines that the print job is set to the one-side printing, and is not set to the both-side printing (S250: NO). When it is determined that the print job is set to the one-side printing, the printer driver 26 determines whether banding is to be performed (S252). The banding is a method to divide an image for one page into a plurality of bands (i.e., blocks) and creates the printing image data for each band and performs printing of each band when the image for one page is printed.

The printer driver 26 determines whether or not the banding is to be performed based on the setting information included in the function DrvEnableSurface. For example, when information regarding setting which is not suitable for dividing the image of one page into a plurality of bands is contained in the setting information included in the function DrvEnableSurface, the printer driver 26 determines that the banding is not to be performed. Further, the printer driver 26 determines whether the banding is to be performed based on not only the setting information included in the function DrvEnableSurface, but also the available capacity of the memory of the printer 50. For example, the printer driver 26 communicates with the printer 50 and obtains the available capacity of the printer 50. Then, the printer driver 26 determines that the banding is to be performed when the available capacity of the printer 50 as obtained is less than the data amount corresponding to the image data of the image for one page. On the other hand, the printer driver 26 determines that the banding is not to be performed when the obtained available capacity of the printer 50 is equal to or larger than the data amount corresponding to the image data of the image for one page.

When, whether or not the banding is to be performed is determined according to the above method, and when it is determined that the banding is to be performed, the printer driver 26 creates a surface of image data for one band (S254). That is, the printer driver 26 secures an area in which the image data for one band can be stored in the data storage 34, and creates information designating the area (hereinafter, referred to as a memory information). Next, the printer driver 26 performs a banding setting (S256). That is, the printer driver 26 creates information indicating that the banding is to be performed (hereinafter, referred to as banding information). Then, the DrvEnableSurface subroutine is terminated.

When it is determined that the setting information included in the function DrvEnableSurface contains the both-side setting information, the printer driver 26 determines that the print job is set to be the both-side printing (S250: YES), and executes S258. When the printer driver 28 determines that the banding is not executed (S252: NO), the printer driver 26 also executes S258. In S258, the printer driver 26 creates the surface of the image data for one page (S258). That is, the printer driver 26 secures an area for storing the image data for one pate in the data storage 34, and creates memory information with which the secured area of the data storage 34. Thereafter, the DrvEnableSurface subroutine is terminated.

As described above, in the DrvEnableSurface subroutine, the banding is set. It is noted that the banding is set only when the print job is set to be the one-side printing. When the print job is set to the both-side printing, the banding is not set. Thereafter, when the DrvEnableSurface subroutine is terminated, the printer drive 26 outputs the memory information to the OS 28 as shown FIG. 3 (S202). At this stage, if the banding information has not been created, the printer driver 26 also outputs the banding information to the OS 28. It is noted that, when the a subroutine of the printer driver 26 is terminated, the printer driver 26 outputs information indicating that the function called by the OS 28 has been completed to the OS 28.

Next, the OS 28 calls the function DrvStartDoc (which is an example of job start information) of the printer driver 26 (S204). When the function DrvStartDoc is called, the printer driver 26 outputs information indicating that the function DrvStartDoc is completed to the OS 28. Subsequently, the OS 28 calls the function DrvStartPage (which is an example of page start information) of the printer driver 26 (S208). As mentioned above, in the function DrvStartPage of the conventional printer driver 100 contains the setting information and the page position information. In contrast, the function DrvStartPage of the printer driver 26 does not contain the setting information, while the page position information is contained. The printer driver 26 performs the DrvStartPage subroutine when the function DrvStartPage is called by the OS 28 (S210).

Figure 5:
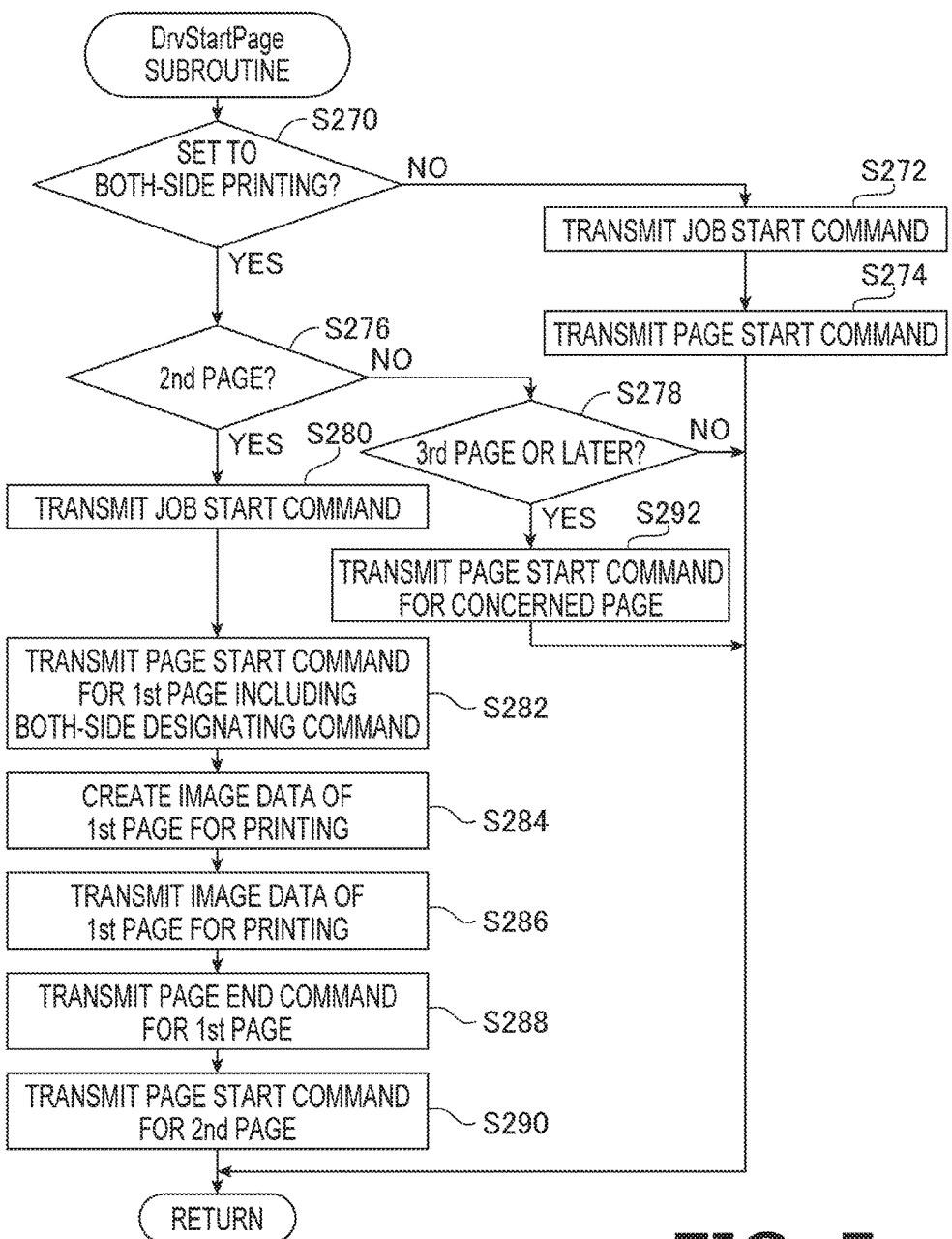
FIG. 5 is a flowchart illustrating a DrvStartPage subroutine according to the embodiment.

In the DrvStartPage subroutine, as shown in FIG. 5, the printer driver 26 determines whether the print job is set to be the both-side printing (S270). Since the method of determination in S270 is the same as that in S250, and description thereof is omitted. When it is determined that the print job is set to the both-side printing (S270: NO), the printer driver 26 transmits the job start command to the printer 50 (S272). Thereafter, the printer driver 26 transmits the page start command to the printer 50 (S274). It is noted that the printer driver 26 transmits the page start command to the printer 50 with designating the page indicated by the page position information included in the function DrvStartPage.

Further, in the page start command, a command corresponding to the setting information is included. Therefore, in the page start command transmitted in S274, the one-side designating command is included. That is, as determined in S270, since the print job is set to the one-side printing, the one-side designating command indicating the one-side printing is included in the page start command. Then, the DrvStartPage subroutine is terminated. It is noted that, in the flowing description, a case where the print job is set to the one-side printing will be described.

Figure 3:
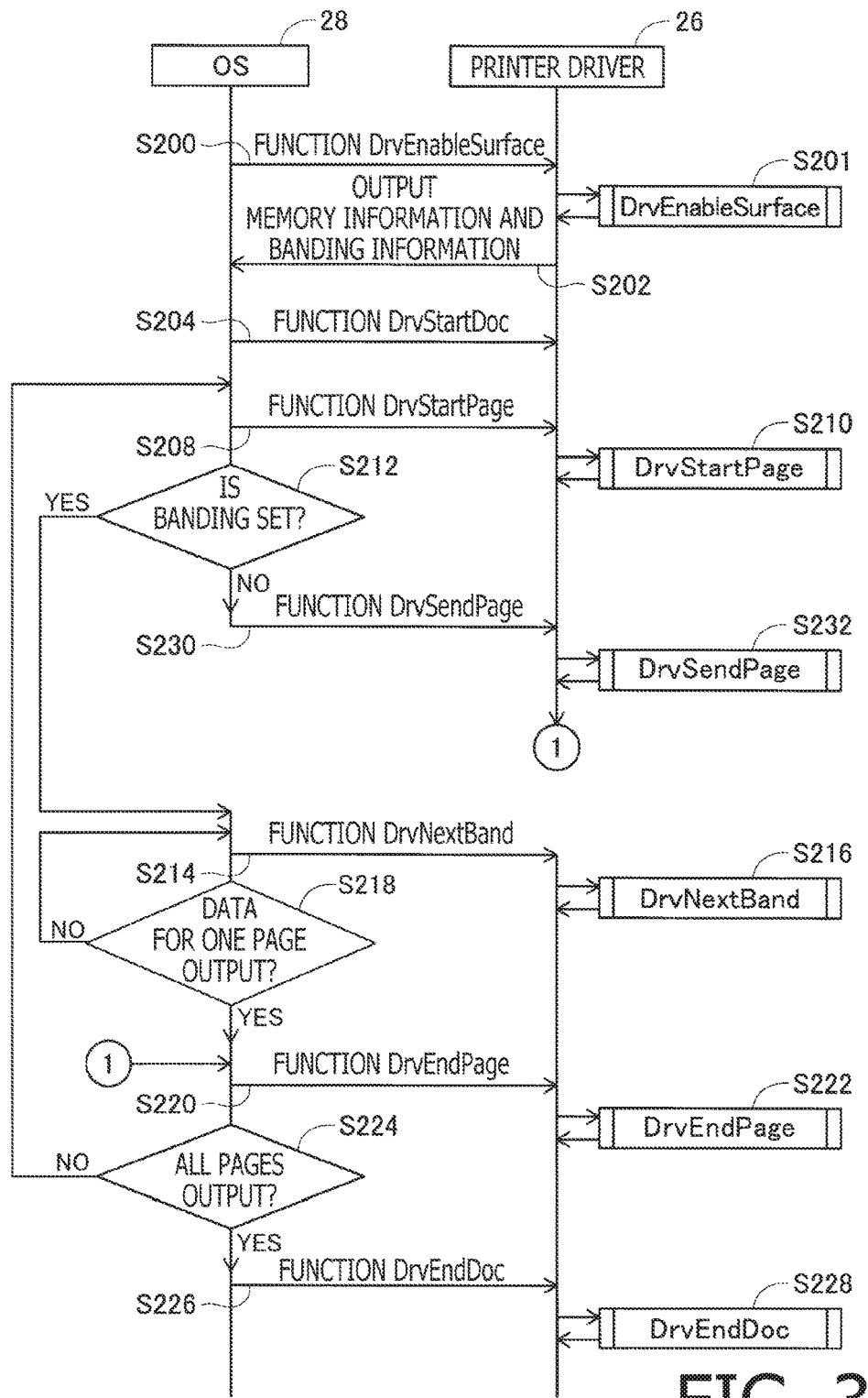
FIG. 3 shows an operation sequence of a printer driver and the OS according to the embodiment.

As shown in FIG. 3, after calling the function DrvStartPage, the OS 28 determines whether the banding is set (S212). That is, the OS 28 determines whether the banding information has been received in S206. When it is determined that the banding information has been received, the OS 28 determines that the banding is set, while, when it is determined that the banding information has not been received, the OS 28 determines that the banding is not set.

When the OS 28 determines that the banding is set (S212: YES), the OS 28 calls a function DrvNextBand of the printer driver 26 (S214). The function DrvNextBand includes image data for one band as an argument thereof. When the function DrvNextBand is called, the printer driver 26 executes a DrvNextBand subroutine (S216).

Figure 4B:
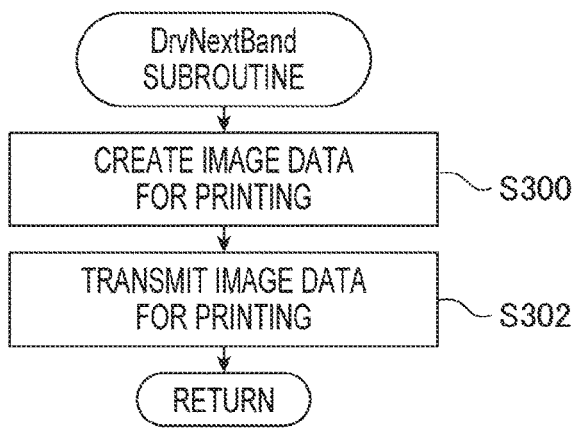
FIG. 4B is a flowchart illustrating a DrvNextBand subroutine according to the embodiment.

In the DrvNextBand subroutine, the printer driver 26 creates printing image data as shown in FIG. 4B (S300). At this stage, the printer driver 26 creates the printing image data based on the image data for one band included in the function DrvNextBand. It is noted that the banding is set only when the print job is set to the one-side printing, the printer driver 26 creates the image data for one-side printing in S300. Thereafter, the printer driver 26 transmits the thus created one-band of image data for the one-side printing to the printer 50 (S302). Then, the DrvNextBand subroutine is terminated.

The printer 50 executes the printing process based on the printing image data, which is received from the printer driver 26. In the above example, the print condition is set, in the printer 50, based on the one-side designating command included in the page stat command transmitted in S274, the printer 50 executes the one-side printing based on the received printing image data for one band of image.

Further, as shown in FIG. 3, when calling the function DrvNextBand, the OS 28 determines whether the image data for one page has been transmitted to the printer driver 26 (S218). That is, the OS 28 determines whether the image for one page is divided into a plurality of bands, and the function DrvNextBand is called with the image data of images of all of the plurality of bands being included therein. When it is determined that the image data for one page has not been output (S218: NO), the OS 28 repeats S214 and S218, thereby outputting the image data for one page to the printer driver 26. After the image data for one page has been output to the printer driver 26 (S218: YES), the OS 28 proceeds to S220.

When it is determined that the banding is not set (S212: NO), the OS 28 calls the function DrvSendPage of the printer driver 26 (S230). It is noted that the function DrvSendPage includes image data for one page as the argument. When the function DrvEndPage is called, the printer driver 26 executes the DrvSendPage subroutine (S232).

Figure 6:
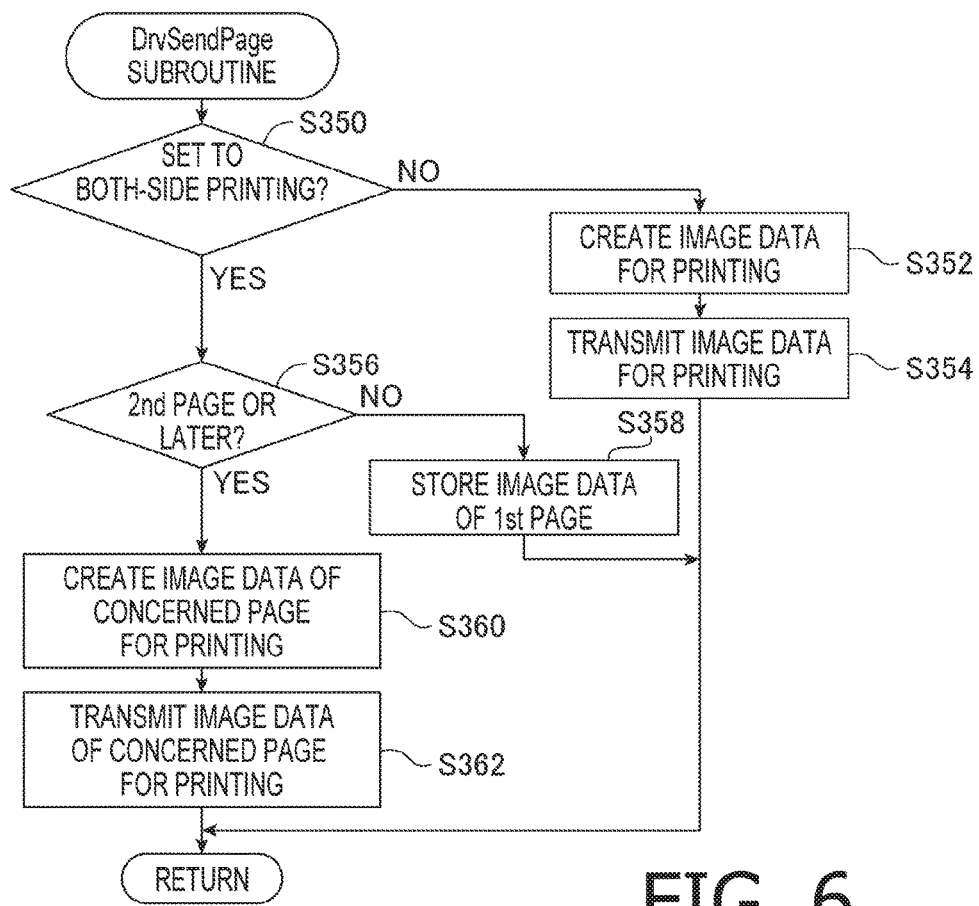
FIG. 6 is a flowchart illustrating a DrvSendPage subroutine according to the embodiment.

In the DrvSendPage subroutine, the printer driver 26 determines whether the print job is set to the both-side printing as shown in FIG. 6 (S350). Since the determination method in S350 is the same as in S250, description thereof is omitted. Since the description is explaining the case where the print job is set to the one-side printing, the printer driver 26 determines that the print job is set to the one-side printing (S350: NO). Then, the printer driver 26 create the printing image data based on the image data for one page included in the function DrvSendPage (S352). As determined in S350, since the print job is set to the one-side printing, the printer driver 26 creates the image data for one-side printing. Thereafter, the printer driver 26 transmits the image data for one page of one-side printing as created to the printer 50 (S354). Then, the DrvSendPage subroutine is terminated, and as shown in FIG. 3, the printer driver 26 proceeds to S220.

The printer 50 performs the print process based on the printing image data as received. That is, in the printer 50, since the print condition is set in accordance with the one-side designating command included in the page start command transmitted in S274, the printer 50 executes the one-side printing process based on the printing image data as received and print one page of an image.

When it is determined that the image data for one page has been output (S218: YES), or when the DrvSendPage subroutine executed in S232 is terminated, the OS 28 calls a function DrvEndPage of the printer driver 26 (S220). When the function DrvEndPage is called, the printer driver 26 executes a DrvEndPage subroutine (S222).

Figure 7:
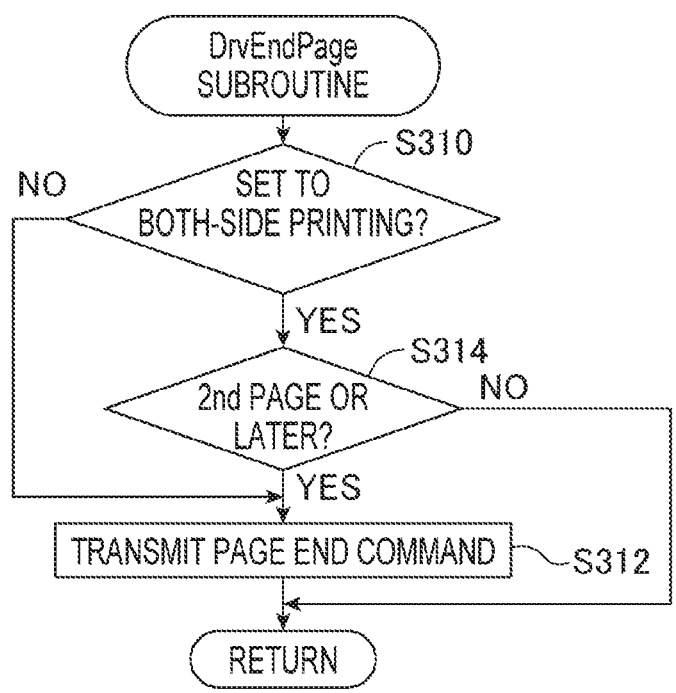
FIG. 7 is a flowchart illustrating a DrvEndPage subroutine according to the embodiment.

In the DrvEndPage subroutine, the printer driver 26 determines, as shown in FIG. 7, whether the print job is set to the both-side printing (S310). Since the determining method in S310 is the same as that in S250, description thereof is omitted. Since the description is being made for the case where the print job is set to the one-side printing, it is determined that the print job is set to the one-side printing (S310: NO). Thereafter, the printer driver 26 transmits the page end command to the printer 50 (S312). Then, the DrvEndPage subroutine is terminated.

As shown in FIG. 3, after calling the function DrvEndPage, the OS 28 determines whether the image data for all the pages of the document received from the application 24 has been output to the printer driver 26 (S224). That is, the OS 28 determines whether the OS 28 has called the function DrvNextBand or DrvSendPage with including the image data for all the pages of the document. When the image data for all the pages of the document has not been output to the printer driver 26 (S224: NO), a process in S208-S222, or a process in S208-S212. S230. S232. S220 and S222 is repeatedly executed. As a result, when the document has a plurality of pages of images, the print process for the second page and later is repeatedly executed, thereby the image data for all the pages of the document being determined to be output (S224: YES).

When it is determined that the image data for all the pages of the document has been output (S224: YES), the OS 28 calls a function DrvEndDoc of the printer driver 26 (S226). When the function DrvEndDoc is called, the printer driver 26 executes a DrvEndDoc subroutine (S228).

Figure 8:
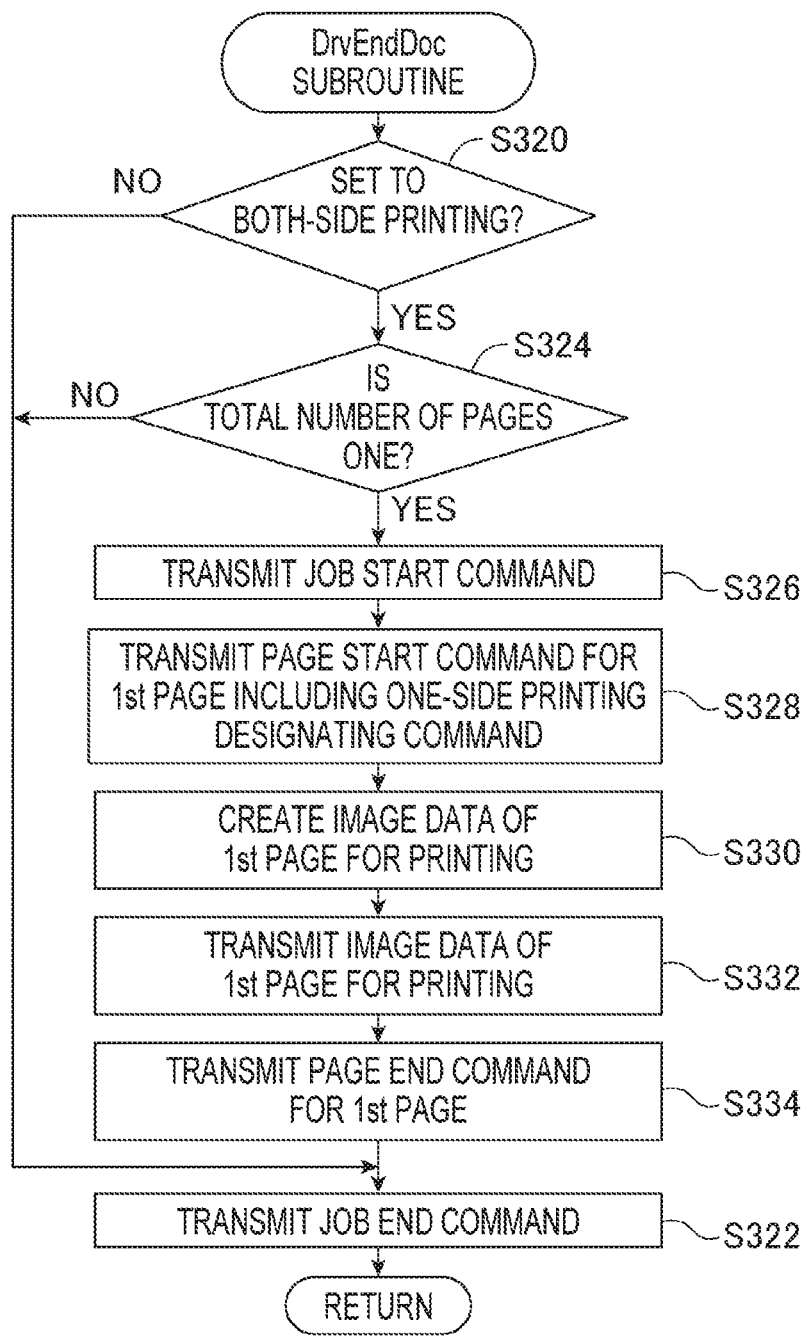
FIG. 8 is a flowchart illustrating a DrvEndDoc subroutine according to the embodiment.

In the DrvEndDoc subroutine, the printer driver 26 determines, as shown in FIG. 8, whether the print job is set to the both-side printing (S320). Since the determining method in S320 is the same as that in S250, description thereof is omitted. Further, the present description is being made under assumption that the print job is set to the one-side printing, it is determined that the print job is set to the one-side printing (S320: NO). Then, the printer driver 26 transmits the job end command to the printer 50 (S322), and the DrvEndDoc subroutine is terminated. Thus, the process of the printer driver 26 when the print job is set to the one-side printing is completed.

Next, a process of the printer driver 26 in S210 and thereafter when the print job is set to the both-side printing, that is, the process of DrvStartPage subroutine and thereafter will be described.

In the DrvStartPage subroutine, the printer driver 26 determines, as shown in FIG. 5, whether the print job is set to the both-side printing (S270). Since the description here is being made under assumption that the print job is set to the both-side printing, it is determined that the print job is set to the both-side printing (S270: YES).

Next, the printer driver 26 determines whether the page position information included in the function DrvStartPage indicates the second page (S276). In this description, the print job is set to the both-side printing and the function DrvStartPage of the printer driver 26 is called first time, the page position information included in the function DrvStartPage indicates the first page. Therefore, it is determine that the page position information included in the function DrvStartPage does not indicate the second page (S276: NO).

Next, the printer driver 26 determines whether the page position information included in the function DrvStartPage indicates the third page or later (S278). Since the function DrvStartPage is called first time, the page position information indicates the first page. Therefore, it is determined that the page position information included in the function DrvStartPage does not indicate the third page or later (S278: NO). Then, the DrvStartPage subroutine is terminated. When the function DrvStartPage including the page position information indicating the first page is called, the conventional printer driver 100 transmits the job start command and the page start command designating the first page to the printer 50. In contrast, the printer driver 26 does not transmit the job start command or the page start command designating the first page to the printer 50 when the function DrvStartPage including the page position information indicating the first page is called.

Next, as shown in FIG. 3, the OS 28 determines the handing is set or not after calling the function DrvStartPage (S212). However, since the print job is set to the both-side printing, the banding is not set. Therefore, it is determined that the banding is not set (S212: NO). Then, the OS 28 calls the function DrvSendPage of the printer driver 26 (S230). When the function DrvSendPage is called, the printer driver 26 executes the DrvSendPage subroutine (S232).

In the DrvSendPage subroutine, the printer driver 26 determines, as shown in FIG. 6, whether the print job is set to the both-side printing (S350). Since the present description being made under assumption that the print job is set to the both-side printing, it is determined that the print job is set to the both-side printing (S350: YES). Next, the printer driver 26 determines whether the page position information included in the function DrvSendPage indicates the second page (S356). Since the position information included in the function DrvStartPage indicates the first page, it is determined that the page position information included in the function DrvStartPage does not indicate the second page (S356: NO). Thereafter, the printer driver 26 stores the image data for the first page in the data storage 34 (S358). Then, the DrvSendPage subroutine is terminated.

That is, in the function DrvSendPage, the image data for one page is included. In the present description, it is assumed that the print job is set to the both-side printing, and the function DrvSendPage of the printer driver 26 is called first time. Therefore, in the function DrvSendPage, the image data for the first page is included and the printer driver 26 stores the image data for the first page in the storage area 34. Then, the DrvSendPage subroutine is terminated. When the function DrvStartPage including the page position information indicating the first page is called, the conventional printer driver 100 creates the image data of the first page for printing and transmits the created image data to the printer 50. In contrast, the printer driver 26 stores the image data of the first page in the storage 34, and does not create the printing image data or transmit the image data to the printer 50.

After calling the function DrvSendPage, the OS 28 calls the function DrvEndPage of the printer driver 26 (S220). When the function DrvEndPage is called, the printer driver 26 executes a DrvEndPage subroutine (S222). In the DrvEndPage subroutine, the printer driver 26 determines, as show in FIG. 7, whether the print job is set to the both-side printing (S310). Since the description is being made under assumption that the print job is set to the both-side printing, it is determined that the print job is set to the both-side printing (S310: YES).

Next, the printer driver 26 determines whether the page position information included in the function DrvStartPage indicates the second page (S314). Since, when the function DrvStartPage is firstly called, the page position information indicates the first position. Therefore, it is determined that the page position information does not indicate the second page (S314: NO). Then, the DrvStartPage subroutine is terminated.

As shown in FIG. 3, after calling the function DrvEndPage, the OS 28 determines whether the image data of all the pages of the document received from the application 24 has been transmitted to the printer driver 26 (S224). That is, the OS 28 determines whether the OS 28 has called the function DrvSendPage with including the image data for all the pages of the document. In this case, even if the document received from the application 24 includes the images for more than one page, since the OS 28 has called the function DrvSendPage including only the first page. Therefore, the OS 28 determines that the image data for all the pages of the document received from the application 24 has not been transmitted to the printer driver 26 (S224: NO).

When the image data for all the pages of the document has not been output (S224: NO), the OS 28 calls the function DrvStartPage including the page position information indicating the second page (S208). When the function DrvStartPage is called, the printer driver 26 executes the DrvStartPage subroutine (S210). In the DrvStartPage subroutine, as shown in FIG. 5, the printer driver 26 determines whether the print job is set to the both-side printing (S270). Since the description is being made under assumption that the print job is set to the both-side printing, it is determined that the print job is set to the both-side printing (S270: YES).

Next, the printer driver 26 determines whether the page position information included in the function DrvStartPage indicates the second page (S276). As mentioned above, the description is being made under assumption that the function DrvStartPage includes the page position information indicating the second page, it is determined that the page position information included in the function DrvStartPage indicates the second page (S276: YES).

Next, the printer driver 26 transmits the job start command to the printer 50 (S280). Then, the printer driver 26 transmits the page start command corresponding to the first page to the printer 50 (S282). In the page start command, commands according to the setting information included in the function DrvEnableSurface are included, the both-side designating command is included in the page start command transmitted in S282. According to the conventional printer driver 100, when the function DrvStartPage indicating the page position information indicating the first page is called, the conventional printer driver 100 transmits the job start command and the page start command corresponding to the first page to the printer 50. In contrast, according to the printer driver 26, the job start command and the page start command corresponding to the first page is transmitted to the printer 50 when the function DrvStartPage including the page position information indicating the second page is called.

After transmitting the page start command corresponding to the first page to the printer 50, the printer driver 26 creates the printing image data for an image of the first page (S284). Since the image data of the image of the first page is stored in the data storage area 34, the printer driver 26 creates the printing image data based on the image data for the first page stored in the data storage area 34. Since the print job is set to the both-side printing, the printer driver 26 creates the image data for the both-side printing. Then, the printer driver 26 transmits the both-side printing image data for one page as created to the printer 50 (S286). It is noted that the conventional printer driver 100 creates the printing image data for the first page and transmits the same to the printer 50 when the function DrvSendPage for the first page is called. In contrast, the printer driver 26 creates the image data of printing the first page and transmits the same to the printer when the function DrvStartPage for the second page is called.

After transmitting the printing image data for the first page to the printer 50, the printer driver 26 transmits the page end command corresponding to the first page to the printer 50 (S288). Thereafter, the printer driver 26 transmits the page start command corresponding to the second page to the printer 50 (S290). Then, the DrvStartPage subroutine is terminated.

As shown in FIG. 3, after calling the function DrvStartPage, the OS 28 determines whether the banding is set (S212). However, as mentioned above, when the print job is set to the both-side printing, the banding is not set. Therefore, in this case, it is determined that the banding is not set (S212: NO). Then, the OS 28 calls the function DrvSendPage of the printer driver 26 (S230). When the function DrvSendPage is called, the printer driver 26 executes the DrvSendPage subroutine (S232).

As shown in FIG. 6, in the DrvSendPage subroutine, the printer driver 26 determines whether the print job is set to the both-side printing (S350). Since the print job is set to the both-side printing, it is determined that the print job is set to the both-side printing (S350: YES). Next, the printer driver 26 determines whether the page position information included in the function DrvSendPage indicates the second page or later (S356). Since the function DrvStartPage including the page position information indicating the second page has already been called, it is determined that the page position information included in the function DrvSendPage indicates the second page or later (S356: YES).

Then, the printer driver 26 creates the printing image data (S360). At this stage, the printer driver 26 creates the printing image data based on the image data included in the function DrvSendPage, that is, the image data of the image of the second page of the document. Since the print job is set to the both-side printing, the printer driver 26 creates the image data for the both-side printing. Thereafter, the printer driver 26 transmits the both-side printing image data of the second page as created to the printer 50 (S362). Then, the DrvSendPage subroutine is terminated.

As shown in FIG. 3, after calling the function DrvSendPage, the OS 28 calls the function DrvEndPage of the printer driver 26 (S220). When the function DrvEndPage is called, the printer driver 26 executes the DrvEndPage subroutine (S222). In the DrvEndPage subroutine, the printer driver 26 determines, as shown in FIG. 7, whether the print job is set to the both-side printing (S310). At this stage, the print job is set to the both-side printing, it is determined that the print job is set to the both-side printing (S310: YES).

Next, the printer driver 26 determines whether or not the page position information included in the function DrvStartPage indicates the second page or later (S314). At this stage, the DrvStartPage including the function including the page position information indicating the second page has already been called, it is determined that the page position information included in the function DrvSendPage indicates the second page or later (S314: YES). Then, the printer driver 26 transmits the page end command corresponding to the page indicated by the page position information included in the function DrvStartPage, that is the page end command corresponding to the second page to the printer 50 (S312). Then, the DrvEndPage subroutine is terminated.

After calling the function DrvEndPage, the OS 28 determines, as shown in FIG. 3, whether the image data for all the pages of the document received from the application 24 has been transmitted to the printer driver 26 (S224). In this case, according to the description above, the OS 28 has only called the function DrvSendPage including the image data for the first page and the function DrvSendPage including the image data for the second page. Therefore, if, for example, the document, which the OS 28 has received from the application 24, includes the images for more than two pages, the OS 28 determines that the image data for all the pages of the document received from the application 24 has not been transmitted to the printer driver 26 (S224: NO).

Then, the OS 28 calls the function DrvStartPage including the page position information indicating the third page (S208). At this stage, the printer driver 26 executes the DrvStartPage subroutine (S210). In the DrvStartPage subroutine, the printer driver 26 determines, as shown in FIG. 5, whether the print job is set to the both-side printing (S270). As described above, since the print job is set to the both-side printing, it is determined that the print job is set to the both-side printing (S270: YES).

Next, the printer driver 26 determines whether the page position information included in the function DrvStartPage indicates the second page (S276). As mentioned above, since the function DrvStartPage includes the page position information indicating the third page, it is not determined that the page position information included in the function DrvStartPage indicates the second page (S276: NO). Subsequently, the printer driver 26 determines whether or not the page position information included in the function DrvStartPage indicates the third page or later (S278). As mentioned above, since the function DrvStartPage includes the page position information indicating the third page, it is determined that the page position information included in the function DrvStartPage indicates the third page or later (S278: YES). Then, the printer driver 26 transmits the page start command corresponding to the page indicated by the page position information included in the function DrvStartPage (i.e., the third page) to the printer 50 (S292). Then, the DrvStartPage subroutine is terminated.

After the DrvStartPage subroutine is terminated, the printer driver 26 and the OS 28 execute the processes of S212, S230, S232, S220 and S222 as shown in FIG. 3. Since these processes are the same as those described above, description thereof is omitted.

After execution of S222, that is, after calling the function DrvEndPage, the OS 28 determines whether the image data for all the pages of the document received from the application 24 has been transmitted to the printer driver 26 (S224). If, for example, the document the OS 28 has received from the application 24, includes images for more than three pages, the OS 28 determines that the image data for all the pages has not been transmitted to the printer driver 26 (S224: NO), and the OS 28 repeatedly executes the processes of S208-S212, S230, S232, S220 and S222 until the image data for all the pages of the document has been transmitted to the printer driver 26. When the OS 28 has transmitted the image data for all the pages of the document to the printer driver 26, it is determined that the image data for all the pages of the document has been transmitted to the printer driver 26 (S224: YES).

Next, the OS 28 calls the function DrvEndDoc of the printer driver 26 (S226). When the function DrvEndDoc is called, the printer driver 26 executes the DrvEndDoc subroutine (S228). In the DrvEndDoc subroutine, the printer driver 26 determines, as shown in FIG. 8, whether the print job is set to the both-side printing (S320). At this stage, since the print job is set to the both-side printing, it is determined that the print job is set to the both-side printing (S320: YES). Next, the OS 28 determines whether the number of the pages of the images of the document is one (S324).

As mentioned above, since the function DrvStartPage including the page position information indicating the second page or later has been called, the printer driver 26 determines that the number of pages of the image of the document is more than one (S324: NO). Then, the printer driver 26 transmits the job end command to the printer 50 (S322), and the DrvEndDoc subroutine is terminated. As above, the process of the printer driver 26 when the print job is set to the both-side printing and the number of pages of the image of the print-target document is more than two is completed.

Next, a process in a case where the print job is set to the both-side printing, and the number of pages of the images of the print-target document is one will be described. It is noted that, in a case where the print job is set to the both-side printing, and the number of pages of the images of the print-target document is one, when the function DrvStartPage for the first page is called, the printer driver 26 has not transmitted either the job start command or the page start command corresponding to the first page to the printer 50 in the DrvStartPage subroutine. Further, when the function DrvSendPage for the first page is called, the printer driver 26 has stored the image data for the first page in the data storage 34, and has not created the printing image data for the first page or transmitted the printing image data to the printer 50.

According to the above-described assumption, as shown in FIG. 3, the OS 28 calls the function DrvEndPage of the printer driver 26 (S220) after calling the function DrvSendPage for the first page. When the function DrvEndPage is called, the printer driver 26 executes the DrvEndPage subroutine (S222). In the DrvEndPage subroutine, the printer driver 26 determines, as shown in FIG. 7, whether the print job is set to the both-side printing (S310). According to the assumption, the print job is set to the both-side printing, it is determined that the print job is set to the both-side printing (S310: YES).

Next, the printer driver 26 determines whether or not the page position information included in the function DrvStartPage indicates the second page or later (S314). In the present description, the function DrvStartPage for the first page has been called, but the function DrvStartPage for the second page has not been called. Therefore the page position information included in the function DrvStartPage indicates the first page, but does not indicate the second page or later (S314: NO), thus, the DrvEndPage subroutine is terminated, while the printer driver 26 does not transmit the page end command to the printer 50.

After calling the function DrvEndPage, the OS 28 determines, as shown in FIG. 3, whether the image data of all the pages of the document received from the application 24 has been transmitted to the printer driver 26 (S224). According to the assumption, the number of pages of the image of the document is one, and the function DrvSendPage including the image data for the first page has been called, the OS 28 determines that the image data of all the pages of the document received from the application 24 to the printer driver 26 (S224: YES).

Then, the OS 28 calls the function DrvEndDoc of the printer driver 26 (S226). When the function DrvEndDoc is called, the printer driver 26 executes the DrvEndDoc subroutine (S228). In the DrvEndDoc subroutine, the printer driver 26 determines, as shown in FIG. 8, whether print job is set to the both-side printing (S320). In this case, since the print job is set to the both-side printing, it is determined that the print job is set to the both-side printing (S320: YES). Next, the OS 28 determines whether the number of pages of the images of the documents is one (S324). According to the assumption, the number of pages of the images of the document is one, and the function DrvEndDoc has been called in a state where the function DrvSendPage including the image data for the first page has been called but the function DrvSendPage including the image data for the second page has not been called, the OS 28 determines that the number of pages of the images of the document is one (S324: YES).

Then, the printer driver 26 transmits the job start command to the printer 50 (S326). Subsequently, the printer driver 26 transmits the page start command corresponding to the first page to the printer 50 (S328). It is noted that, although the setting information is set to indicate the both-side printing, sine the number of pages of the images of the document is one, the printer driver 26 transmits the page start command including the one-side designating command to the printer 50. Next, the printer 26 creates the printing image data for an image of the first page (S330). Since the image data of the image of the first page has been stored in the data storage area 34 in the DrvSendPage subroutine, the printer driver 26 creates the printing image data based on the image data for the first page stored in the data storage 34. At this stage, although the pint job is set to the both-side printing, since the number of the pages of the images of the document is one, the printer driver 26 creates the image data for the one-side printing. Thereafter, the printer driver 26 transmits the thus created one-side printing image data for the first page to the printer 50 (S332). Subsequently, the printer driver 26 transmits the page end command corresponding to the first page to the printer 50 (S334). Then, the printer driver 26 transmits the job end command to the printer 50 (S322). Then, the DrvEndDoc subroutine is terminated.

As above, in the process executed by the printer driver 26, in a case where the setting information is set to designate the both-side printing, when the function DrvStartPage for the first page and the function DrvSendPage for the first page are called, the printer driver 26 does not transmit the job start command and the pages start command for the first page to the printer 50, does not create the printing image data for the first page, and does not transmit the printing image data for the first page to the printer 50. Then, after the function DrvSendPage for the first page has been called, the function DrvEndDoc is called without the function DrvSendPage for the second page being called, the printer driver 26 transmits the job start command, and the page start command corresponding to the first page. Further, the printer driver 26 creates the printing image data for the first page, and transmits the thus created printing image data for the first page to the printer 50.

In this case, the printer driver 26 transmits the page start command including the one-side designating command to the printer 50, creates the one-side printing image data, and transmits the one-side printing image data to the printer 50. That is, when the number of pages of the images of the document is one, the printer driver 26 transmits the page start command including the one-side designating command to the printer 50, creates the one-side printing image data, and transmits the one-side printing image data to the printer 50. Accordingly, even when the setting information is set to designated the both-side printing, the printing process with the setting of the one-side printing can be performed for the document of which the number of pages of the images is one. Since the printing of the document of which the number of pages of the images is one is performed with the setting of the one-side printing, the switch-back of the printing sheet is not performed after the image for the first page has been printed on the printing sheet, and the printing sheet is discharged from the printer 50 with the surface on which the image was printed being directed upside. According to the above configuration, it is possible to prevent the printing sheet from being discharged with the printed surface being directed downward, which occurs when the conventional printer driver 100 is used.

Incidentally, when the function DrvStartPage for the second page is called after the function DrvSendPage for the first page has been called, the printer driver 26 transmits the job start command and the page start command for the first page to the printer 50, creates the printing image data for the first page, and transmits the thus created printing image data for the first page to the printer 50. In this case, the printer driver 26 transmits the page start command including the both-side designating command to the printer 50, creates the both-side printing image data, and transmits the created both-side printing image data to the printer 50. That is, when there exists the print job for the second page, the printer driver 26 transmits the page start command including the both-side designating command to the printer 50, creates the both-side printing image data, and transmits the created both-side printing image data to the printer 50. Accordingly, for the document of which the number of pages of images is more than one, the printing process according to the setting of the both-side printing can be performed in accordance with the set condition.

In a state where the setting information is set to indicate the both-side printing and the number of pages of the images of the document is more than one, when the function DrvStartPage for the second page or later is called, the printer driver 26 transmits the page start command corresponding to the page, of which page number is two or later, to the printer 50. Then, when the function DrvSendPage for the second page or later is called, the printer driver 26 creates the printing image data for the page to the printer 50, and transmits the printing image data to the printer 50. According to the above configuration, when the both-side printing for the second page or later is performed, the printer driver 26 can perform the process corresponding to the called functions, responsively.

In a state where the setting information is set to indicate the one-side printing and the function DrvStartPage is called for each page, the printer driver 26 transmits the page start command corresponding to the page to the printer 50. Further, when the function DrvSendPage is called for each page, the printer driver 26 creates the printing image data corresponding to the page, and transmits the created printing image data to the printer 50. According to the above configuration, when the one-side printing is performed, the printer driver 26 can perform the process corresponding to the called functions, responsively.

Further, in a case where the setting information is set to the one-side printing, when the setting condition and conditions regarding the memory of the printer 50 and the like are satisfied, the banding is performed. In banding, the printer driver 26 receives the image data for one band within one page of the image without waiting for receipt of the image data for one page and creates the printing image data for one band, and transmits the created image data for one band to the printer 50. According to this configuration, a start of the printing process in the printer 50 is expedited, thereby the FPOT being shortened.

It is noted that, when the setting information is set to indicate the both-side printing, the banding is not performed. When the both-side printing is performed by the printer driver 26, if the banding is performed, the FPOT may be elongated. That is, when the banding is performed, the function DrvNextBand is called by a plurality of times, while the function DrvSendPage is called once when the banding is not performed. Further, when the printer driver 26 performs the both-side printing process, even if the function DrvSendPage for the first page is called, the printing image data for the first page is not transmitted to the printer 50. When the function DrvSendPage for the second page is called, or when the function DrvSendPage for the second page is not called but the function DrvEndDoc is called, the printing image data for the first page is transmitted to the printer 50. Therefore, when the banding is not performed, after the function DrvSendPage for the first page is once called, in response to the function DrvSendPage for the second page being called or the function DrvEndDoc being called, the printing image data for the first page is transmitted to the printer 50.

When the banding is performed, after the function DrvNextBand for the first page is called by a plurality of times, in response to the function DrvSendPage for the second page or the function DrvEndDoc being called, the printing image data for the first page is transmitted to the printer 50. That is, in order that the printing image data for the first page is transmitted to the printer 50, the function DrvNextBand should be called by a plurality of times if the banding is performed, while the function DrvSendPage should be called once if the banding is not performed. Accordingly, when the printer driver 26 executes the both-side printing process, the FPOT may be elongated by performing the banding. Therefore, when the setting information is set to indicated the both-side printing, shortening of the FPOT is aimed by not performing the banding.

As described above, when the process of the printer driver 26 is set to perform the both-side printing, when the image data for only one page of image is outputted, by the OS 28, to the printer driver 26, the one-side printing process is performed for the image data for only one page of image. However, when the number of pages of the images of the document is an odd number larger than one, the image for the last page is printed on one side of the printing sheet, while no image is printed on the other side of the sheet. However, regarding the image of the last page, the both-side printing is performed. That is, in a state where the setting information is set to indicate the both-side printing and the number of pages of the images of the document is an oxide number larger than one, the one-side printing process is not performed for the image of the last page. It is because, if the one-side printing is performed for the image of the last page, the user may have unnatural feeling since the image quality of images printed on the other pages (i.e., from an image on the first page to an image on a second last page) have the quality of the both-side printing, while the image of the last page has the image quality of the one-side printing. As above, when the number of pages of the images of the document is an odd number larger than one, by performing the both-side printing process for the images of all the pages, occurrence of the above-mentioned unnatural felling can be avoided.

Assume that the number of pages of the images of the document is three (i.e., the third page is the last page). According to the above embodiment, the image for the third page is printed in the setting of the both-side printing. Therefore, after the imaged of the third page is printed, the printing sheet is switched back, and discharged from the printer 50 with the surface on which the image of the third page has been printed being directed downward. Further, the printing sheet on which the image of the third page has been printed is discharged on the printing sheet on which the images for the first and second pages have been printed on both sides, respectively. The printing sheet on which the images of the first page and the second page are printed has been discharged from the printer 50 such that the surface on which the image of the first page is printed is directed downward and the surface on which the image of the second pages is printed is directed upward. That is, the image of the first page is on the downside of the printing sheet and the image of the second page is one the upside of the printing sheet. As the image of the third page is printed in accordance with the both-side printing, the printing sheet on which the image of the third page has been printed is stacked on the printing sheet on which the images of the first and second pages are printed such that the image of the third page is directed downward, while the surface on which no image is formed is directed upward. Therefore, the printing sheets are discharged and stacked such that the order of the pages are continuous as a booklet and natural for the user.

When the third page of the image is printed according to the setting of the one-side printing, the switch-back of the printing sheet is not performed after the third page of the image is printed on the printing sheet, and the printing sheet is discharged with the third page of the image is directed upward. Therefore, on the lower (down) side of the printing sheet firstly discharged, the first page of the images is printed, the second page of the image is printed on the upper side of the firstly discharged printing sheet. According to the above configuration, on the upper side of the printing sheet secondly discharged, the third page of the image is printed, while the lower side of the secondly discharged printing sheet, no image is printed. When viewing the discharged printing sheets as a booklet, a page on which no image is printed is inserted between the second page and the third page of the images, which makes the user feel unnatural. Thus, for the image on the last page, it is preferable to perform the both-side printing process when the previous page(s) are printed according to the both-side printing.

It is noted that the CPU 12 executing S282 and S328 is an example of a transmitting means. The CPU 12 executing S284, S300, S330, S352, S360 is an example of a creating means. The CPU 12 executing S358 is an example of a storage controlling means.

Effects of the Embodiment

According to the above-described embodiment, the following effects can be realized.

When the setting information is set to indicate the both-side printing, on condition that the function DrvStartPage for the second page is called after the function DrvStartPage including the image data for the first page, the printer driver 26 creates the printing image data for the first page. According to this configuration, it is possible that creation of the printing image data is performed after it is known that the total number of pages of the images of the document is more than one page.

In a case where the setting information is set to indicated the both-side printing, when the function DrvSendPage including the image data for the first page is called, the printer driver 26 stores the image data for the in the data storage 34. Then, on condition that the function DrvStartPage for the second page is called, the printer driver 26 creates the printing image data of the image for the first page. Accordingly, it is possible that the image based on the image data for the first page can be printed without deleting the image data for the first page.

When the setting information is set to indicated the both-side printing, the printer driver 26 creates the printing image data of the image for the second page after the function DrvSendPage including the image data for the second page and before the function DrvStartPage of the third page is called. Accordingly, the printing image data for the second page can be created quickly, and the print process of the image for the second page can be performed quickly.

In a case where the setting information is set to indicate the both-side printing and the page start command including the both-side designating command has been sent to the printer 50, on condition that, after the function DrvSendPage including the image data for the first page is called, the function DrvStartPage for the second page is called, the printer driver 26 creates the image data for the both-side printing for the first page. On the other hand, in a state where the setting information is set to indicate the both-side printing but the page start command including the one-side printing has been transmitted to the printer 50, even if the function DrvStartPage for the second page is not called after the function DrvSendPage including the image data for the first page is called, the printer driver 26 creates the image data of the one-side printing for the first page. According to this configuration, the printer driver 26 can create the printing image data in accordance with the designated command.

In a case where the setting information is set to indicate the both-side printing, when the function DrvSendPage including the image data of the images for second page or later is called, the printer driver 26 creates the image data for the both-side printing based on the image data regardless whether the image data is of an odd number page or an even number page. According to the above configuration, it can be possible to prevent the image of the last page from being printed according to the image quality of the one-side printing although the previously printed images have the image quality of the both-side printing.

In a case where the setting information is set to indicate the one-side printing, the page start command corresponding to the first page is sent to the printer 50 when the function DrvStartPage for the first page is called, but the function DrvStartPage for the second page is not called when the function DrvSendPage for the first page is called, the printer driver 26 creates the printing image data for the first page. According to this configuration, the one-side printing process can be performed quickly.

The printer driver 26 transmits the page start command to the printer 50 with including the both-side designating command or the one-side designating command. According to the above configuration, it is possible to notify the printer 50 of whether the setting information is set to the both-side printing or the one-side printing appropriately.

When the setting information is set to indicate the one-side printing, the printer driver 26 outputs the banding information to the OS 28, while, when the setting information is set to indicated the both-side printing, the printer driver 26 does not output the banding information to the OS 28. That is, only when the setting information is set to indicated the one-side printing, the banding is performed, while, when the setting information is set to indicated the both-side printing, the banding is not performed. According to this configuration, it becomes possible to shorten the FPOT when the both-side printing is performed.

It is noted that the aspects of the present disclosures need not be limited to the above-described configuration, and can be modified in various ways in accordance with knowledges of a person skilled in the art. For example, in the above-described embodiment, the printer driver 26 transmits the page start command to the printer 50 with including the both-side designating command or the one-side designating command therein. The above configuration may be modified such that the printer driver 26 may transmit the job start command to the printer 50 with including the both-side designating command or the one-side designating command therein.

In the above-described embodiment, the printer driver 26 transmits the job start command after the function DrvStartPage for the first page has been called. This configuration may be modified such that the job start command is transmitted to the printer 50 in response to the function DrvStartDoc being called. That is, when the DrvStartDoc subroutine is being executed, the printer driver 26 may transmit the job start command to the printer 50. In this case, however, the both-side designating command of the one-side designating command should not be included in the job start command.

In the above-described exemplary embodiment, the processes shown in FIGS. 3-8 are executed by the CPU 12. It is noted such processes may be executed not only by the CPU 12, but by an ASIC or another logical circuit. Further, the processes may be executed by the CPU, ASIC and other logical circuits.

What is claimed is:

1. A non-transitory computer-readable medium for an information processing apparatus having a communication interface and a controller, the communication interface being configured to communicate with a printer, an operating system being installed in the information processing apparatus, the non-transitory computer-readable medium storing instructions realizing a printer driver, the operating system being configured to cause the controller to output a print job to print a document having one or more pages of images delimited by each page to the printer driver, the operating system being configured to cause the controller to output page start information indicating a start of each page of the print job and job end information indicating an end of the print job to the printer driver, and the operating system being configured to cause the controller to output the print job to the printer driver in a mode related to one of both-side designating information indicating the print job is a both-side printing job and one-side designating information indicating the print job is a one-side printing job, in a state where the print job output by the operating system is related to the both-side designating information, the printer driver causing, when executed, the controller:

not to transmit a page start command corresponding to a first page of the print job to the printer in response to receipt of page start information indicating a start of the first page of the print job from the operating system, in response to receipt of page start information indicating a start of a second page of the print job, to transmit the page start command corresponding to the first page of the print job to the printer through the communication interface in a mode related to the both-side designating command indicating the both-side printing, and in response to receipt of the job end information from the operation system without receiving the page start information indicating a start of the second page of the print job from the operating system, to transmit the page start command corresponding to the first page of the print job to the printer through the communication interface in a mode related to the one-side designating command indicating the one-side printing.

2. The non-transitory computer-readable medium according to claim 1,
wherein the operating system is configured to cause the controller to output the print job delimited by each page to the printer driver including image data of the corresponding page,
wherein the printer driver causes, when executed, the controller to perform:
in response to receipt of image data of an image included in the print job delimited by each page from the operating system, creating image data for printing based on the image data as received; and
when the page start command corresponding to the first page has been transmitted to the printer through the communication interface in the mode related to the both-side designating command, in a state where the image data of the image of the first page of the document included in the print job for the first page is received from the operating system, on condition that the page start information indicating the start of the second page of the print job from the operating system, creating the image data for printing based on the image data of the image of the first page of the document.

3. The non-transitory computer-readable medium according to claim 2,
wherein the printer driver causes, when executed, the controller to perform:
in response to receipt of the image data of the image of the first page included in the print job for the first page of the document, storing the image data of the image of the first page in a memory of the information processing apparatus; and
in a state where the image data of the image of the first page included in the print job of the first page from the operating system, on condition that the page start information indicating the start of the second page of the print job is received from the operating system, creating the image data for printing based on the image data of the image of the first page stored in the memory.

4. The non-transitory computer-readable medium according to claim 2,
wherein the printer driver causes, when executed, the controller to perform:
when receiving the image data for an image of a second page of the document included in the print job for the second page, creating the image data for printing based on the image data of the image of the second page even when the page start information indicating a third page of the print job has not been received from the operating system.

5. The non-transitory computer-readable medium according to claim 2, wherein the printer driver causes, when executed, the controller to perform:
   in a state where the page start command corresponding to the first page has been transmitted to the printer through the communication interface in a mode related to the both-side designating command, in response to receipt of the image data of the image of the first page included in the print job for the first page from the operating system, on condition that the page start information indicating the start of the second page of the print job is received from the operating system, creating the image data for the both-side printing which is image data in a mode corresponding to the both-side printing based on the image data of the image of the first page: and
   in a state where the page start command corresponding to the first page has been transmitted to the printer through the communication interface in a mode related to the one-side designating command, creating the image data for one-side printing which is the image data in a mode corresponding to the one-side printing based on the image data of the image of the first page even if the page start information indicating the start of the second page of the print job has not been received from the operating system.

6. The non-transitory computer-readable medium according to claim 5, wherein in a state where the page start command corresponding to the first page has been transmitted to the printer through the communication interface in a mode related to the both-side designating command, the printer driver causes, when executed, the controller to perform:
   in response to receipt of the image data of an image of the second page or later included in the print job for the second page or later, creating the image data for the both-side printing based on the image data of the image of the second page or later as received regardless of the image data of the image of the second page or later is the image data of an odd page or an even page.

7. The non-transitory computer-readable medium according to claim 2, wherein in a state where the print job output by the operating system is related to the one-side designating information the printer driver causes, when executed, the controller to perform:
   in response to receipt of the page start information of the first page of the print job from the operating system, transmitting the page start command corresponding to the first page; and
   in response to receipt of the image data of the image of the first page included in the print job for the first page from the operating system, creating the image data for printing based on the image data of the image for the first page even if the page start information indicating the start of the second page of the print job has not been received from the operating system.

8. The non-transitory computer-readable medium according to claim 1, wherein in a state where the print job output by the operating system is related to the both-side designating information, the printer driver causes, when executed, the controller to perform:
   in response to receipt of the page start information indicating the start of the first page of the print job from the operating system, not transmitting the page start command corresponding to the first page;
   in response to receipt of the page start information indicating the start of a second page of the print job from the operating system, transmitting the page start command corresponding to the first page to the printer through the communication interface in a mode including the both-side designating command; and
   in response to receipt of the job end information from the operating system without receiving the page start information indicating the start of the second page of the print job from the operating system, transmitting the page start command corresponding to the first page to the printer through the communication interface in a mode including the one-side designating command.

9. The non-transitory computer-readable medium according to claim 1,
   wherein the operating system is configured to cause the controller to output job start information indicating the start of the print job to the printer driver, and output the page start information to the printer driver after outputting the job start information,
   in a state where the print job output by the operating system is related to the both-side designating information, the printer driver causing, when executed, the controller to perform:
   in response to receipt of the page start information indicating the start of the first page of the print job from the operating system after receiving the job start information, transmitting none of a job start command corresponding to the print job and the page start command corresponding to the first page of the print job to the printer;
   in response to receipt of the page start information indicating the start of the second page of the print job, transmitting the page start command corresponding to the first page of the print job to the printer after transmitting the job start command to the printer through the communication interface in a mode including the both-side designating command; and
   in response to receipt of the job end information form the operating system without receiving the page start information indicating the start of the second page of the print job from the operating system, transmitting the page start command corresponding to the first page of the print job to the printer through the communication interface after transmitting the job start command to the printer through the communication interface in a mode of including the one-side designating command.

10. The non-transitory computer-readable medium according to claim 1, wherein the printer driver causes, when executed, the controller to perform:
    determining whether banding is to be executed for the print job output by the operating system when the print job is related to the one-side designating information; and
    outputting information indicating execution of the banding to the operating system when it is determined that the banding is to be executed, determination on whether the banding is to be executed for the print job output by the operating system not being performed when the print job is related to the both-side designating information.

11. An information processing apparatus having a communication interface and a controller, the communication interface being configured to communicate with a printer, an operating system and a printer driver for the printer being installed in the information processing apparatus, the operating system being configured to cause the controller to output a print job to print a document having one or more pages of images delimited by each page to the printer driver, the operating system being configured to cause the controller to output page start information indicating a start of each page of the print job and job end information indicating an end of the print job to the printer driver, and the operating system being configured to cause the controller to output the print job to the printer driver in a mode related to one of both-side designating information indicating the print job is a both-side printing job and one-side designating information indicating the print job is a one-side printing job, in a state where the print job output by the operating system is related to the both-side designating information, the controller executes the printer driver to:

not transmit a page start command corresponding to a first page of the print job to the printer in response to receipt of page start information indicating a start of the first page of the print job from the operating system;

transmit the page start command corresponding to the first page of the print job to the printer through the communication interface in a mode related to the both-side designating command indicating the both-side printing in response to receipt of page start information indicating a start of a second page of the print job; and transmit the page start command corresponding to the first page of the print job to the printer through the communication interface in a mode related to the one-side designating command indicating the one-side printing in response to receipt of the job end information from the operation system without receiving the page start information indicating a start of the second page of the print job from the operating system.

12. A non-transitory computer-readable medium for an information processing apparatus having a communication interface and a controller, the communication interface being configured to communicate with a printer, an operating system being installed in the information processing apparatus, the non-transitory computer-readable medium storing instructions realizing command output software for print, the operating system being configured to cause the controller to output a print job to print a document by the printer to the command output software, the document having one or more pages of images delimited by each page, the operating system being configured to cause the controller to output page start information indicating a start of each page of the print job and job end information indicating an end of the print job to the command output software, and the operating system being configured to cause the controller to output the print job to the command output software in a mode related to one of both-side designating information indicating the print job is a both-side printing job and one-side designating information indicating the print job is a one-side printing job, in a state where the print job output by the operating system is related to the both-side designating information, the command output software causing, when executed, the controller:

not to output a page start command corresponding to a first page of the print job in response to receipt of page start information indicating a start of the first page of the print job from the operating system, in response to receipt of page start information indicating a start of a second page of the print job, to output the page start command corresponding to the first page of the print job in a mode related to the both-side designating command indicating the both-side printing, and in response to receipt of the job end information from the operation system without receiving the page start information indicating a start of the second page of the print job from the operating system, to output the page start command corresponding to the first page of the print job in a mode related to the one-side designating command indicating the one-side printing.

13. An information processing apparatus having a communication interface and a controller, the communication interface being configured to communicate with a printer, an operating system and command output software for print for the printer being installed in the information processing apparatus, the operating system being configured to cause the controller to output a print job to print a document by the printer to the command output software, the document having one or more pages of images delimited by each page, the operating system being configured to cause the controller to output page start information indicating a start of each page of the print job and job end information indicating an end of the print job to the command output software, and the operating system being configured to cause the controller to output the print job to the command output software in a mode related to one of both-side designating information indicating the print job is a both-side printing job and one-side designating information indicating the print job is a one-side printing job, in a state where the print job output by the operating system is related to the both-side designating information, the controller executes the command output software to:

not output a page start command corresponding to a first page of the print job in response to receipt of page start information indicating a start of the first page of the print job from the operating system;

output the page start command corresponding to the first page of the print job in a mode related to the both-side designating command indicating the both-side printing in response to receipt of page start information indicating a start of a second page of the print job; and output the page start command corresponding to the first page of the print job in a mode related to the one-side designating command indicating the one-side printing in response to receipt of the job end information from the operation system without receiving the page start information indicating a start of the second page of the print job from the operating system.

* * * * *